Sept. 18, 1923.　　　J. S. HOGG ET AL　　　1,468,297
CLIP FOR PIPES OR TUBES
Filed Jan. 5, 1923
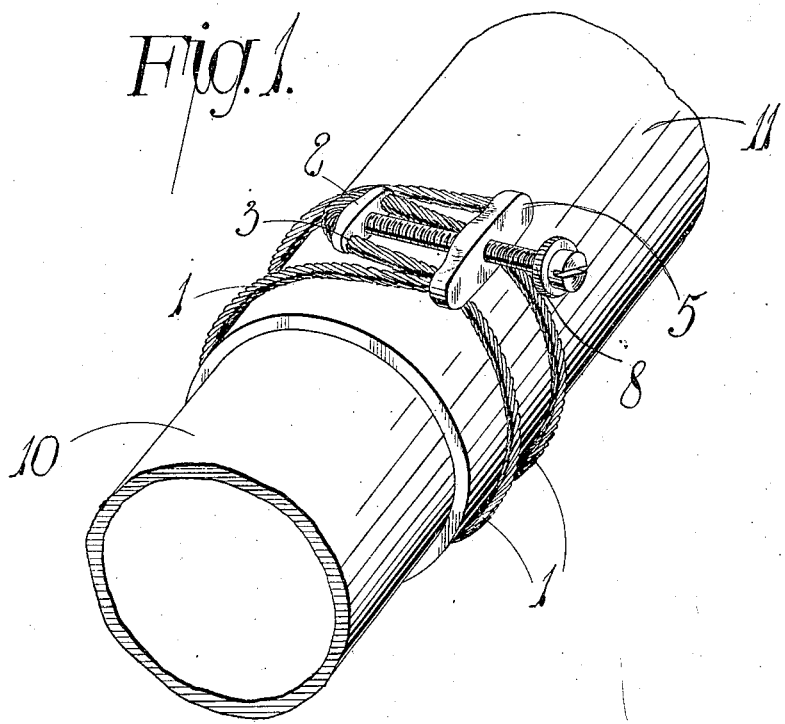
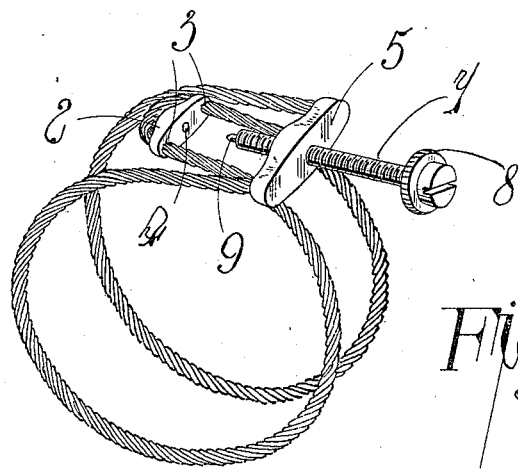

Patented Sept. 18, 1923.

1,468,297

UNITED STATES PATENT OFFICE.

JOHN STEADMAN HOGG AND HENRY LANE, OF WEDNESFIELD, ENGLAND.

CLIP FOR PIPES OR TUBES.

Application filed January 5, 1923. Serial No. 610,854.

*To all whom it may concern:*

Be it known that we, JOHN STEADMAN HOGG and HENRY LANE, subjects of the King of Great Britain, residing at Eagle Works, Wednesfield, in the county of Stafford, England, have invented certain new and useful Improvements in Clips for Pipes or Tubes; and we do hereby declare the following to be a full, clear, and exact description of the same.

This invention relates to clips for pipes or tubes and is intended primarily for use in connecting flexible tubes on to metal pipes but is applicable in every case where it is necessary or desirable to obtain a radial pressure upon a pipe or tube around the circumference thereof. Our invention is, for instance, suitable for use in connecting flexible hoses or the like on to metal nozzles or for connecting two lengths of rigid tube together by a short length of rubber tubing.

According to the present invention, the clip comprises a flexible member which can be placed around the tube, the flexible member having at or near one or both ends means whereby the flexible member may be forcibly contracted on to the tube.

Such means may either take the form of a screw passing through a nut member at one end of the flexible member and engaging with a suitable fixture at the other end of the flexible member or the contracting or securing means may take the form of a lever pivoted to one end of the flexible member and adapted to act upon the other end of the flexible member to obtain the necessary tension or pressure. If a lever is employed it is preferred that the arrangement should be such that in applying the pressure, the lever should move over a dead centre position so as to be self-locking.

It is preferred to arrange that the ends of the flexible member overlap so that to apply the necessary pressure, the said ends have to be forced apart, instead of being drawn together.

Referring to the drawings:—

Figure 1 is a perspective view showing a clip according to our invention in its operative position on a pair of tubes.

Figure 2 is a perspective view showing the clip detached.

In the construction illustrated upon the accompanying drawings the flexible member consists of a length of stranded wire cable 1 but it might take the form of ordinary metal wire, cord or the like or it might take any other suitable form. Although the flexible member in our clip may be made of any suitable material, we much prefer to use some material such as stranded wire or cord which is flexible in any direction and which is so readily flexible that it can easily be straightened under slight tension. By using such material the pressure exerted upon the pipe by the clip is much more evenly distributed around the pipe than when only partially flexible materials are used.

The length of cable 1 is doubled upon itself at about the centre, and mounted upon the two parallel lengths of wire thus obtained is a bridge member 2. This bridge member 2 is made of metal and has two holes 3 through which the ends of the wire 1 are passed. The two lengths of cable are thus held in spaced relationship by the bridge member 2. At its centre the bridge member 2 is provided with a hole or recess 4.

At the two ends of the cable 1 a second metal bridge member 5 is provided which receives the two ends of the cable 1. This bridge member 5 is provided with a pair of conical holes into which the ends of the cable are passed and partially unravelled and expanded therein. The holes are then filled up with solder or other suitable metal and the outer end is then smoothed off so that the hole is not visible, a permanent joint thus resulting. At its centre this bridge member 5 is bored and tapped and a screw 7 is passed through this tapped hole, which screw is provided at one end with a milled head 8 to enable it to be turned, and at its other end with a central spigot portion 9 adapted to engage in the central hole or recess 4 in the other bridge member 2.

In operation a clip formed in this manner is bent into circular form and the middle part of the cable, carrying the bridge member 2 is passed between the two parts of the cable adjacent the bridge member. When the clip is in position to connect together the two tubes, such as 10 and 11 (10 being of metal and 11 being of flexible material), the necessary contracting pressure is obtained by engaging the spigot portion 9 at the free end of the screw 7 in the central hole 4 in the bridge member 2 and then turning the screw 7 to contract the clip.

A single size of clip may be made applicable to various diameters of tubes by arranging that one of the bridge members, preferably the one 2 at the centre of the flexible member, can be adjusted or slidden along the wire. In order to make this bridge member retain any position into which it has been moved along the wire, distance pieces may be provided to fit in between the bridge member and the double portion of the flexible member.

Instead of using a single length of flexible member and doubling it upon itself at about its centre, two separate flexible members may be employed having their ends secured to the bridge members.

In use a clip according to the present invention has the considerable advantage that it can be engaged around a tube without placing it over the end of the tube.

It is obvious that a single clip of this kind could also be used if necessary to connect up a pair of pipes by means of a butt joint, one branch of the flexible member being adapted to secure the cover tube to each of the abutting tubes, i. e. the clip is placed half on one side and half on the other side of the joint.

One of the advantages of making the clip of extremely flexible material is that it can be satisfactorily applied to tubes or pipes of any cross section, i. e. to oval tubes for instance.

What I claim then is:—

1. A pipe clip comprising a single length of flexible material bent at the middle to form two substantially parallel portions; two abutment members, one extending transversely between each of the ends of the two spaced portions of the flexible member, both having spaced openings for the reception of the flexible member, which openings extend parallel to the flexible member, the abutment member which extends between the ends of the flexible member being longer than the other and having the holes therein spaced apart by a greater distance than the holes in the other abutment member located between the bend in the flexible member so that the parts of the flexible members near the end having the longer abutment members are sufficiently widely spaced to allow the abutment member at the opposite end to be passed between them; and means associated with the abutments adapted to apply pressure to the abutments in the plane in which the flexible member extends.

2. A pipe clip comprising a single length of flexible material bent at the middle to form two substantially parallel portions; an abutment member having a central protuberance adapted to fit within the bend in the flexible member and spaced openings in the ends of said abutment for the flexible member to pass through; a locating hole in the centre of said abutment member extending parallel with the openings therein; an abutment member on the other end of the flexible member having spaced openings in which the ends of the flexible members are rigidly secured, this member being longer and has its openings spaced apart by a greater distance than the openings in the abutment members located in the bend of the flexible member so that the parts of the flexible members near the end having the longer abutment member are sufficiently widely spaced to allow the abutment member at the opposite end to be passed between them; a tapped hole in the centre of said longer abutment member extending parallel with the openings therein; and a screw passing through the tapped hole in the longer abutment member and extending to engage in the locating hole in the other abutment member whereby pressure is applied to the abutment members in the plane in which the ends of the flexible members extend to contract the latter.

In witness whereof we affix our signatures.

J. S. HOGG.
HENRY LANE.